April 29, 1941.  T. HUNTINGTON  2,240,399
BRAKING RUNNER FOR HAULING VEHICLES
Filed Jan. 30, 1939  4 Sheets-Sheet 4
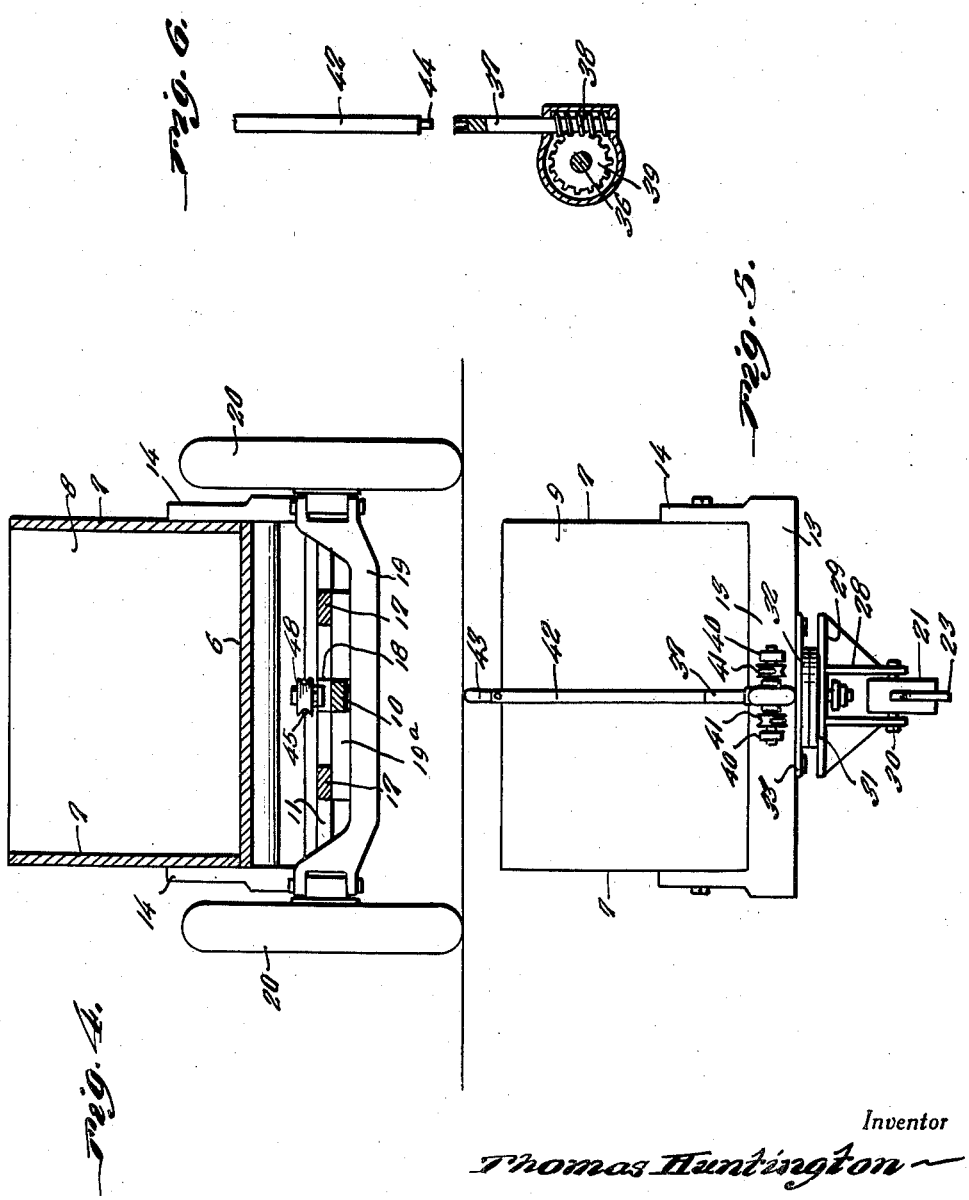
Inventor
Thomas Huntington
By Clarence A. O'Brien
and Hyman Berman
Attorneys Patented Apr. 29, 1941

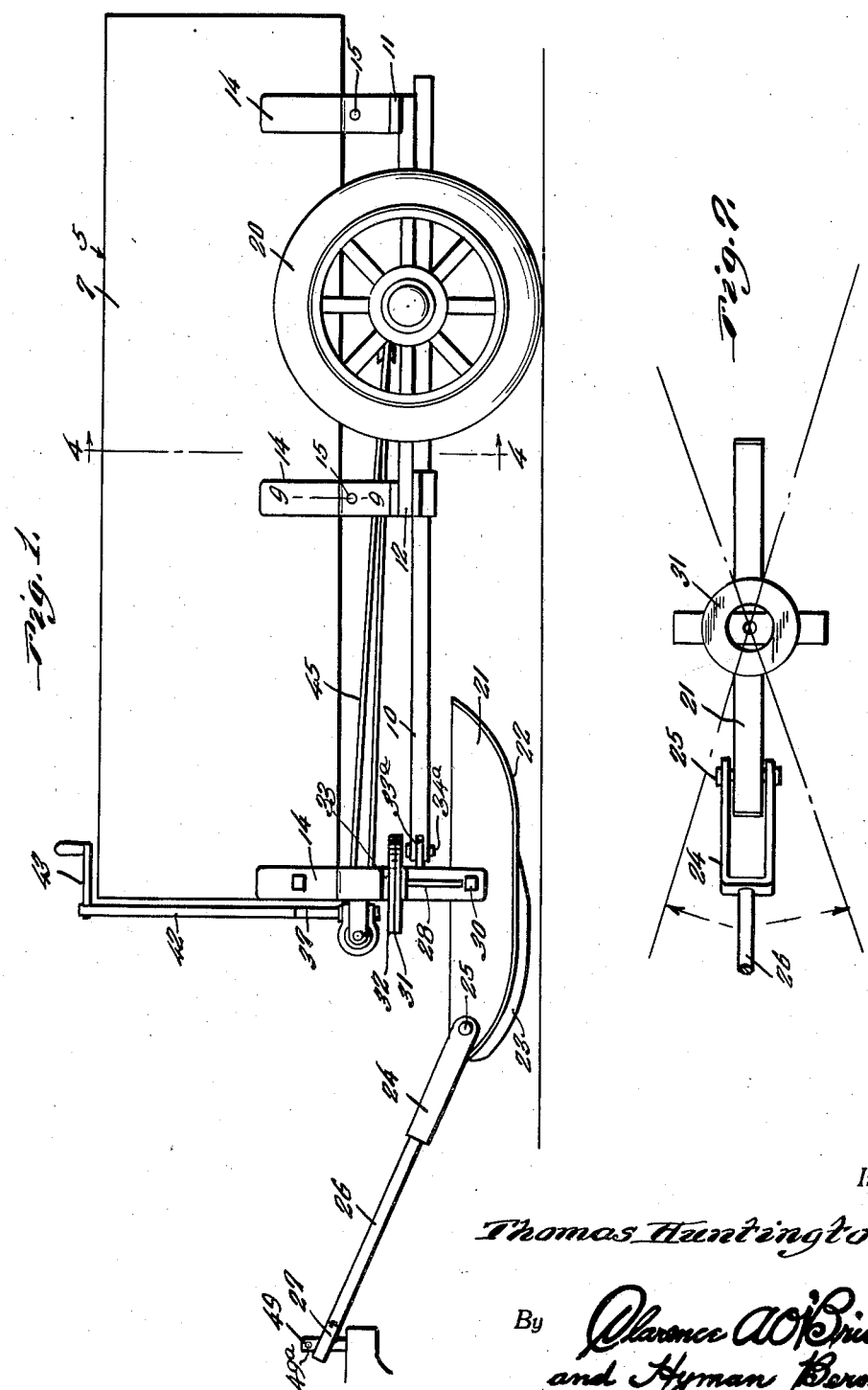

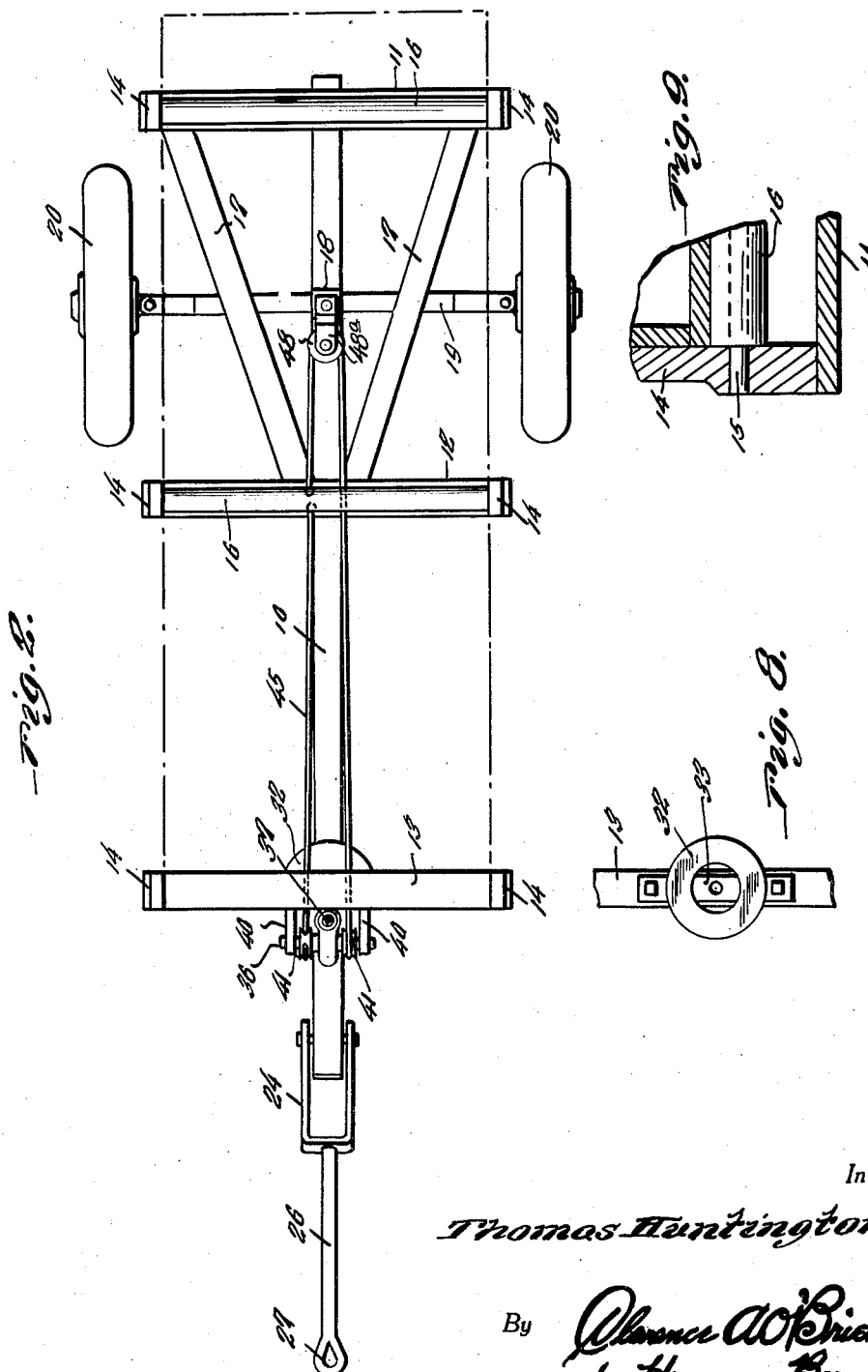

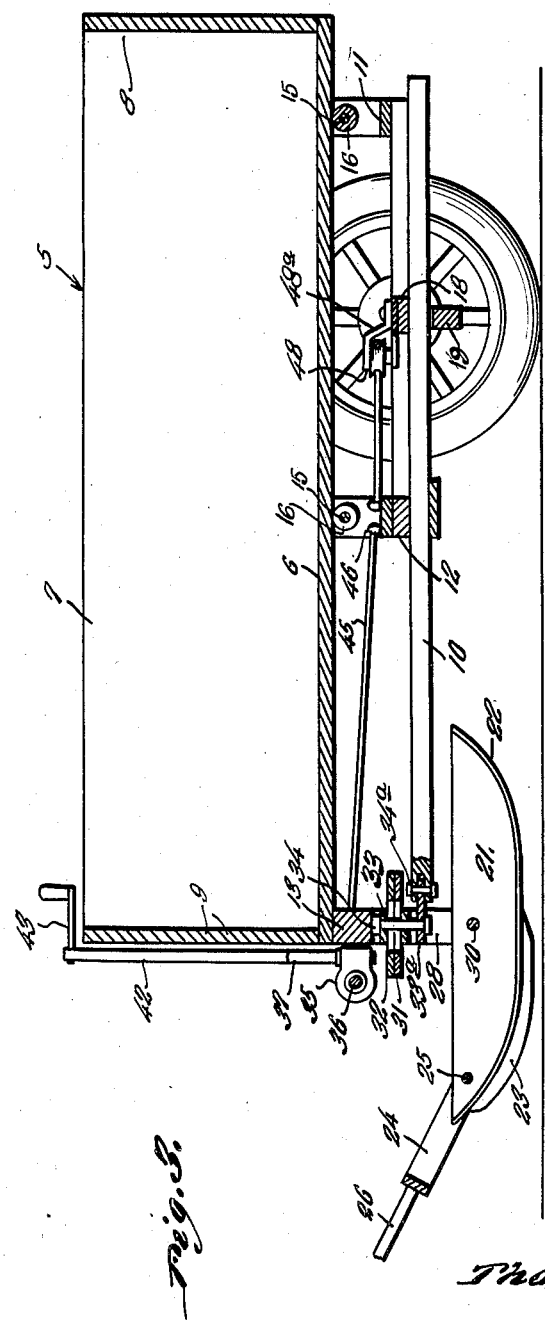

2,240,399

UNITED STATES PATENT OFFICE 2,240,399

BRAKING RUNNER FOR HAULING VEHICLES

Thomas Huntington, Fossil, Oreg.

Application January 30, 1939, Serial No. 253,641

2 Claims. (Cl. 188—5)

This invention appertains to new and useful improvements in hauling vehicles and more particularly to a vehicle especially adapted for use in hauling heavy loads.

The principal object of the present invention is to provide a vehicle which includes a braking runner and wheels which can be properly adjusted under the load to balance the same.

Another important object of the invention is to provide a vehicle involving a runner and wheels wherein the wheels are adjustable to a position to balance the load and wherein the runners are used principally as braking means to retard the descent of the vehicle down a slope.

These and other objects and advantages of the invention will become apparent to the reader of the following specification.

In the drawings—

Figure 1 represents a side elevational view of a vehicle.

Figure 2 is a top plan view of the chassis.

Figure 3 is a longitudinal vertical sectional view.

Figure 4 is a cross sectional view on a line 4—4 of Figure 1.

Figure 5 is a front elevational view.

Figure 6 is a fragmentary detailed sectional view of the manual adjusting means.

Figure 7 is a top plan view of the runner assembly.

Figure 8 is a bottom plan view of the bearing annulus for the runner.

Figure 9 is a fragmentary detailed sectional view taken substantially on a line 9—9 of Figure 1.

Figure 10 is a bottom plan view of the runner assembly.

Referring to the drawings wherein like numerals designate like parts, it can be seen that the vehicle consists of the body generally referred to by numeral 5 and which consists of the bottom 6, the side walls 7, the back wall 8 and front wall 9.

The chassis of the truck consists of the elongated beam 10. Numeral 11 represents the back support, numeral 12 the intermediate support and the numeral 13 the transverse beam at the under side of the bottom 6, the transverse beam 13 being secured to the under side of the bottom 6 as shown in Figure 3.

Upstanding guide legs 14 rise from the ends of the supports 11 and 12 and extend upwardly along the sides 7. Shafts 15 have their ends disposed into the lower portions of the legs 14 and on these shafts 15 are rollers 16 upon which the bottom 6 of the vehicle body rests.

Brace members 17 extend from the rear support 11 convergingly to the support 12, while the block 18 is secured in place on the rear portions of the beam 10. A riser 18a is secured to the axle bar 19 and in turn has the brace member 17 secured thereto, the brace members at their ends being secured to the bars 11 and 12.

The front runner assembly as shown in Figure 7 consists of the runner block 21 having the metallic strip 22 suitably secured to its riding edge and from this strip 22 depends the anti-skidding fin 23. To the forward end of the block 21 is secured the yoke 24 by a pin or the like 25, this yoke having the tongue 26 extending therefrom and preferably formed with an eye 27 at its lead vehicle attaching end.

A yoke 28 depends from the cross member 29 and through this yoke 28 and the body of the runner is disposed the pin 30. Thus the runner is rockably supported. At the top of the cross member 29 is suitably secured the bearing annulus 31 on which the bearing annulus 32 at the under side of the front beam 13 is rideable, the annulus 32 being secured to member 33 on the under side of the member 13.

A pin 34 extends downwardly through the annular members 32 and 31 to pass downwardly through a plate extension 33a which is pivotally secured at its rear end as at 34a to the forward end of the beam 10.

A gear housing 35 is suitably secured to the front side of the beam 13 and has the shaft 36 extending horizontally therethrough while the lower end of the shaft section 37 extends vertically therethrough. The lower end of the shaft section 37 has a worm 38 which meshes with the gear 39 on the shaft 36. The ends of the shaft 36 are journalled in the bearings 40—40 and each end portion of the shaft 36 also carries a pulley 41.

As is shown in Figures 1 and 3, the shaft 37 has a complementary shaft section 42 which is disposed upwardly and has the crank handle 43 at its upper end. A pin and recess connection 44 is provided between the said shaft sections 42 and 37.

Two cables 45 are employed. One of these cables has one of its ends attached to one of the pulleys 41 with its other end attached to the bar 12, while the other cable has one end attached to the other pulley 41 and extends rearwardly to be trained around a pulley 48 carried by a holder 43a (see Fig. 2) and returned forwardly to attach to the same bar 12.

It can thus be seen, that when the crank handle 43 is rotated, the cable 45 is moved in such a manner as to shift the entire wheel assembly under the vehicle body 5 with the result that accurate balancing of the load is obtainable.

When the load is properly balanced and is being pulled over level ground or up hill, the runner 21 will just barely be touching the ground, if at all, and there will be practically no hindrance to the free travel of the vehicle. However, in coming down hill, any retardation of the lead vehicle will result in the buckling under of the forward end of the load carrying vehicle with the result that the runner 21 is brought down to the ground and acts as a retarding agent for the vehicle. This is of course due to the manner in which the tongue 26 is connected to the lead vehicle, the lead vehicle preferably having upstanding pins 49 over which the eye 27 is disposed. This pin 49 may have a cross member 49a extending therethrough to prevent displacement of the eye 27.

The upstanding legs 14 serve to guide the wheeled assembly when it is being adjusted under the vehicle body 5.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A hauling vehicle comprising a body, a wheeled carriage for the body, a ground engaging drag under the forward end portion of the body and a draft member extending from the said drag, said wheeled carriage being adapted to balance the load of the body and its contents to maintain the drag removed from the ground while a pulling force is exerted on the draft member, and means constructed and arranged to permit shifting of the carriage beneath the body to regulate the balance disposition of the carriage with respect to the body, said means comprising a hand operated member, a guide for the carriage and a cable arrangement operatively connected with the carriage and controlled by the said manually operated member.

2. A hauling vehicle comprising a body, a wheeled carriage for the body, a ground engaging drag under the forward end portion of the body, a draft member extending from said drag, said wheeled carriage being adapted to balance the load of the body and its contents to maintain the drag removed from the ground while a pulling force is exerted on the dragft member, a winch on the forward end of the body, means for operating the winch, and a cable extending from the winch to the wheeled carriage whereby the body can be shifted over the wheeled carriage to properly balance the same over the said carriage.

THOMAS HUNTINGTON.